US009475439B2

United States Patent
Fetzer et al.

(10) Patent No.: US 9,475,439 B2
(45) Date of Patent: *Oct. 25, 2016

(54) BATTERY SYSTEM FOR MICRO-HYBRID VEHICLES COMPRISING HIGH-EFFICIENCY CONSUMERS

(75) Inventors: Joachim Fetzer, Bad-Ditzenbach (DE); Stefan Butzmann, Beilstein (DE); Holger Fink, Stuttgart (DE)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 913 days.

This patent is subject to a terminal disclaimer.

(21) Appl. No.: 13/521,834

(22) PCT Filed: Jan. 19, 2011

(86) PCT No.: PCT/EP2011/050669
§ 371 (c)(1),
(2), (4) Date: Jul. 12, 2012

(87) PCT Pub. No.: WO2011/092089
PCT Pub. Date: Aug. 4, 2011

(65) Prior Publication Data
US 2013/0026823 A1 Jan. 31, 2013

(30) Foreign Application Priority Data
Jan. 27, 2010 (DE) .................. 10 2010 001 244

(51) Int. Cl.
*B60R 22/00* (2006.01)
*B60R 16/033* (2006.01)
(Continued)

(52) U.S. Cl.
CPC .......... *B60R 16/033* (2013.01); *B60L 11/1851* (2013.01); *B60R 16/03* (2013.01);
(Continued)

(58) Field of Classification Search
CPC .. B60R 16/033; B60R 16/03; B60L 11/1851
See application file for complete search history.

(56) References Cited

U.S. PATENT DOCUMENTS 5,818,115 A * 10/1998 Nagao .................... F02N 11/04
180/65.1
(Continued)

FOREIGN PATENT DOCUMENTS

CN 101150259 A 3/2008
CN 201124763 Y 10/2008
(Continued)

OTHER PUBLICATIONS

Christine Gable and Scott Gable, Reader Question: Why do Electric Cars Need to be Plugged in to Recharge?, Oct. 30, 2009, pp. 1-2 https://web.archive.org/web/20091030004601/http://alternativefuels.about.com/od/electricvehicle1/a/eleccarrechgqu.htm.*

(Continued)

*Primary Examiner* — Jared Fureman
*Assistant Examiner* — Alfonso Perez Borroto
(74) *Attorney, Agent, or Firm* — Maginot, Moore & Beck LLP

(57) ABSTRACT

A battery system for a motor vehicle having an internal combustion engine includes at least one starting circuit, a low-voltage on-board supply system, and an on-board supply system with an increased voltage. The starting circuit has a first battery and a starter that is configured to be connected to the first battery. The low-voltage supply system has at least one electrical consumer and a second battery configured to produce a first voltage. The supply system with increased voltage has an electrical generator and a third battery configured to produce a second voltage that is higher than the first voltage. The electric generator is configured to produce a third voltage that is higher than the second voltage. A first coupling connects the supply system with increased voltage to the low-voltage supply system and transfers energy therebetween. A second coupling connects the low-voltage on-board supply system to the starter circuit.

12 Claims, 2 Drawing Sheets

(51) Int. Cl.
*B60L 11/18* (2006.01)
*B60R 16/03* (2006.01)
*H01M 10/0525* (2010.01)

(52) U.S. Cl.
CPC ....... *H01M10/0525* (2013.01); *Y02T 10/7005* (2013.01); *Y02T 10/705* (2013.01); *Y02T 10/7011* (2013.01); *Y02T 10/7016* (2013.01)

(56) References Cited

U.S. PATENT DOCUMENTS

| | | | | |
|---|---|---|---|---|
| 6,018,941 | A * | 2/2000 | Massey | F02C 7/26 244/53 A |
| 6,177,734 | B1 * | 1/2001 | Masberg | B60K 6/26 290/31 |
| 6,222,341 | B1 * | 4/2001 | Dougherty et al. | 320/104 |
| 6,275,001 | B1 * | 8/2001 | Dierker | F02N 11/0866 320/103 |
| 6,979,977 | B2 * | 12/2005 | Amano et al. | 320/104 |
| 7,236,893 | B2 * | 6/2007 | Gross et al. | 702/57 |
| 2005/0151517 | A1 * | 7/2005 | Cook et al. | 323/207 |
| 2006/0087778 | A1 * | 4/2006 | Hau et al. | 361/56 |
| 2007/0152615 | A1 * | 7/2007 | Newman et al. | 318/481 |
| 2010/0106379 | A1 * | 4/2010 | Soltana et al. | 701/49 |

FOREIGN PATENT DOCUMENTS

| | | |
|---|---|---|
| DE | 198 46 319 C1 | 2/2000 |
| DE | 101 60 266 A1 | 6/2003 |
| DE | 10 2007 048 342 A1 | 4/2009 |
| DE | 10 2007 061 562 A1 | 7/2009 |
| EP | 1 780 864 A1 | 5/2007 |
| JP | 6-504832 A | 6/1994 |
| JP | 2001-218306 A | 8/2001 |
| JP | 2003-92805 A | 3/2003 |
| JP | 2003-158830 A | 5/2003 |
| JP | 2005-533702 A | 11/2005 |
| JP | 2008230405 A * | 10/2008 |
| WO | 02/066293 A1 | 8/2002 |
| WO | WO 2009097923 A1 * | 8/2009 |

OTHER PUBLICATIONS

International Search Report corresponding to PCT Application No. PCT/EP2011/050669, mailed May 11, 2011 (German and English language document) (7 pages).

Su G-J et al., A Low-Cost, Triple-Voltage Bus DC-DC Converter for Automotive Applications, Applied Power Electronics Conference and Exposition, 2005. IEEE, Piscataway, NJ, USA, vol. 2, Mar. 6, 2005, pp. 1015-1021, XP010809360 (7 pages).

* cited by examiner

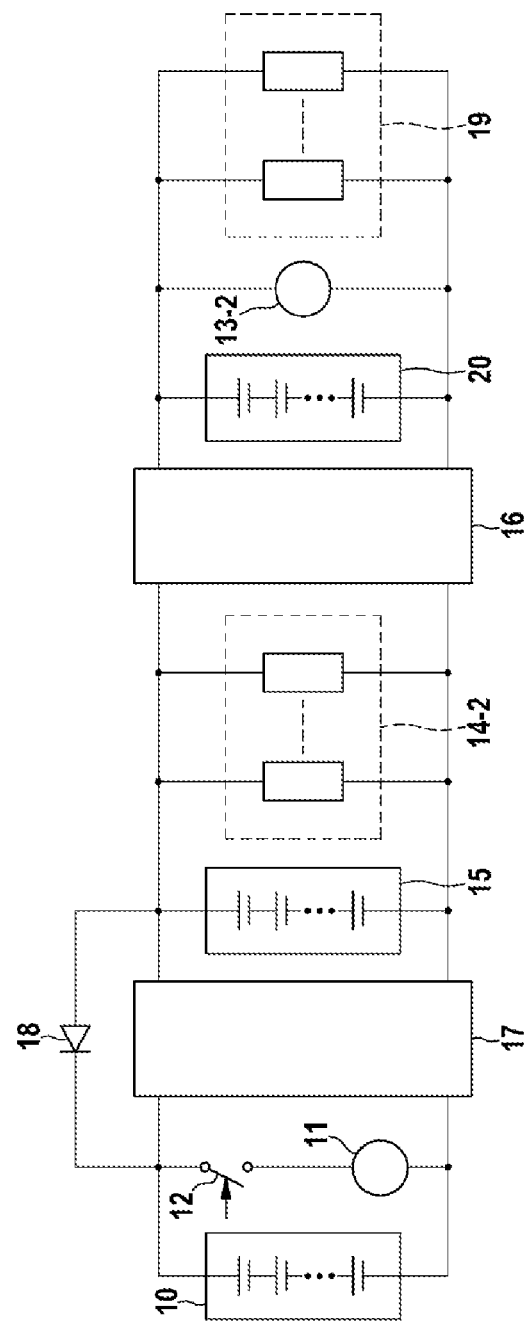

BATTERY SYSTEM FOR MICRO-HYBRID VEHICLES COMPRISING HIGH-EFFICIENCY CONSUMERS

This application is a 35 U.S.C. §371 National Stage Application of PCT/EP2011/050669, filed on Jan. 19, 2011, which claims the benefit of priority to Ser. No. DE 10 2010 001 244.0, filed on Jan. 27, 2010 in Germany, the disclosures of which are incorporated herein by reference in their entirety.

BACKGROUND

The disclosure is based on battery systems for motor vehicles, which battery systems supply a uniform operating voltage to a large number of different electrical consumers. The disclosure also relates to a motor vehicle having a corresponding battery system.

A so-called on-board electrical system, which is operated as standard at 14 V, is provided in motor vehicles comprising internal combustion engines for the purpose of supplying power to the electric starter for the internal combustion engine and other electrical apparatuses of the motor vehicle (see FIG. 1). During starting of the internal combustion engine (not illustrated), a voltage which is dependent on the state of charge of a starter battery 10 which is provided for supplying power is made available to a starter 11, which starts the internal combustion engine (in the example of FIG. 1: when the switch 12 is closed by a corresponding starter signal), by means of the on-board electrical system. If the internal combustion engine is started, said internal combustion engine drives an electrical generator 13-1 ("alternator") which then generates a voltage of approximately 14 V and makes said voltage available to the various electrical consumers 14-1 in the motor vehicle by means of the on-board electrical system. In the process, the electrical generator 13-1 also recharges the starter battery 10 which is subject to loading as a result of the starting process.

So-called micro-hybrid motor vehicles can be expected to become widespread in the near future. In contrast to "pure" hybrid motor vehicles, this class of motor vehicles has only an internal combustion engine for driving purposes. Nevertheless, apparatuses for recovering kinetic energy (recuperation), for example during braking, are provided, but the energy recovered in electrical form in the process is not used for driving purposes but, amongst other things, for an automatic start/stop system and other electrical subsystems, in order to have to use the electrical generator which is operated by the internal combustion engine as seldom as possible, this reducing the loading on the internal combustion engine and therefore fuel consumption by said internal combustion engine.

However, micro-hybrid motor vehicles which are already in series production today have massive problems in respect of the service life of the lead-acid batteries which are usually used since they are subject to a considerable additional charge throughput compared to classical motor vehicles. The reason for this is that the electrical consumers have to be supplied with power by the battery during the stop phases in which the internal combustion engine is switched off. Secondly, the battery which is more rapidly discharged in this way is recharged during the relatively short phases of recuperation, this again constituting loading of the battery. This leads to the batteries in micro-hybrid vehicles sometimes not reaching a service life of two years. Frequent replacement of a battery leads to problems in respect of the reliability of the motor vehicles and annoys customers.

A further problem in motor vehicles which are equipped to current standards is that it is problematical to supply power to high-power electrical consumers, for example electrical air-conditioning compressors or electrical heating systems, with an on-board electrical system which is operated at 14 V because, on account of the relatively low voltage, said consumers have to be fed with very high currents in order to be able to provide the required power.

SUMMARY

The disclosure therefore introduces an on-board electrical system or battery system in which the battery used has a relatively long service life and which is better suited for feeding high-power consumers.

A first aspect of the disclosure introduces a battery system for a motor vehicle comprising an internal combustion engine, wherein the battery system has at least a starter circuit, a low-voltage on-board electrical system and an on-board electrical system with an increased voltage. The starter circuit has a first battery and a starter which is connected or can be connected to the first battery and is designed to start the internal combustion engine in response to a starter signal. The low-voltage on-board electrical system has a second battery, which is designed to generate a first voltage and to output a first voltage to the low-voltage on-board electrical system, and at least one electrical consumer. The on-board electrical system with an increased voltage has a third battery, which is designed to generate a second voltage, which is higher than the first voltage, and to output a second voltage to the on-board electrical system with an increased voltage, and an electrical generator which can be operated by the internal combustion engine and is designed to generate a third voltage, which is higher than the second voltage (and therefore can be used as a charging voltage for the third battery), and to output a third voltage to the on-board electrical system with an increased voltage. The on-board electrical system with an increased voltage is connected to the low-voltage on-board electrical system by means of a first coupling unit which is designed to draw electrical energy from the on-board electrical system with an increased voltage and to supply electrical energy to the low-voltage on-board electrical system. The low-voltage on-board electrical system is connected to the starter circuit by means of a second coupling unit which is designed to draw electrical energy from the low-voltage on-board electrical system and to supply electrical energy to the starter circuit.

The disclosure has the advantage that electrical consumers which are designed for a low (first) voltage can also be operated by the low-voltage on-board electrical system. However, the on-board electrical system with an increased voltage is available for high-power consumers, this on-board electrical system being able to supply relatively low currents to the high-power consumers on account of the relatively high third voltage. In addition, the starter circuit is disconnected from the low-voltage on-board electrical system, and the starter circuit and the low-voltage on-board electrical system each have their own battery. As a result, the low-voltage on-board electrical system is stabilized and rendered relatively less sensitive to the frequent starting processes caused by the automatic start/stop system of the micro-hybrid vehicle. Therefore, in particular, the voltage of the low-voltage on-board electrical system will not dip or will dip to at least a considerably lesser extent during starting, this ensuring that the electrical consumers which are operated in the low-voltage on-board electrical system function in a fault-free and therefore reliable manner.

The on-board electrical system with an increased voltage also has its own battery, and therefore the operation of high-power consumers is also ensured during a stop phase in which the electrical generator cannot be active.

According to the disclosure, the electrical generator is arranged in the on-board electrical system with an increased voltage and supplies electrical energy to said on-board electrical system after the internal combustion engine is started, it also being possible for at least some of this electrical energy to be supplied to the low-voltage on-board electrical system and to the starter circuit for the purpose of charging the second and, respectively, first battery. In this case, the arrangement of the electrical generator in the on-board electrical system with an increased voltage has the advantage that the electrical energy is generated in the on-board electrical system with an increased voltage, the largest consumers also being arranged here. Only a small portion of the electrical energy has to be supplied to the low-voltage on-board electrical system by means of the coupling unit, this improving the degree of efficiency of the entire arrangement. The starter circuit and the low-voltage on-board electrical system again have separate batteries which can locally supply the necessary electrical power to the electrical consumers of the low-voltage on-board electrical system and to the starter and can buffer-store power peaks, so that the coupling unit is relieved of load.

A battery system in which at least one of the first, second or third batteries is a lithium-ion battery is particularly preferred. Lithium-ion batteries can store a larger amount of energy in a given volume than, for example, lead-acid batteries. In this case, it is particularly advantageous for the first and second coupling unit to supply electrical energy from the low-voltage on-board electrical system or from the on-board electrical system with an increased voltage to the starter circuit and, respectively, to the low-voltage on-board electrical system after the internal combustion engine is started and thus to function as a charging device for the first and, respectively, the second battery. In this preferred embodiment of the disclosure, the first and/or second battery should be charged in a special way because they are designed as lithium-ion batteries and are therefore sensitive to overvoltages. A further advantage of lithium-ion batteries is that they can cope with a large number of charging cycles and therefore can increase the reliability of a micro-hybrid motor vehicle.

The on-board electrical system with an increased voltage can have at least one high-power consumer, for example an electrical air-conditioning compressor, an electrical heating system or an electric motor. The at least one electrical consumer of the low-voltage on-board electrical system can be, for example, a music system, a navigation device or an electric window winder.

A diode is provided in an advantageous embodiment of the disclosure, the anode of said diode being connected to the low-voltage on-board electrical system and the cathode of said diode being connected to the starter circuit. If the voltage in the starter circuit dips on account of the high loading during starting of the internal combustion engine, the diode will automatically begin to conduct current and stabilize the voltage of the starter circuit by connecting the second battery parallel to the first battery. Since the diode can carry a considerably greater current than the second coupling unit, the second coupling unit would not be able to stabilize the voltage in the starter circuit as desired.

The first battery can be designed to generate the first voltage and to output the first voltage to the starter circuit. As a result, the voltage in the starter circuit and in the low-voltage on-board electrical system is chosen to be the same, this being expedient particularly in respect of the abovementioned design with a diode. In addition, proven starters which are designed for the low first voltage can also be used in a battery system according to the disclosure.

The first coupling unit and/or the second coupling unit are preferably DC/DC converters.

The first voltage can be between 10 V and 15 V. This voltage range guarantees compatibility with a large number of electrical systems which are available in motor vehicle construction. The first voltage is preferably also provided for the starter circuit for the same reason.

The second voltage is preferably between 24 V and 45 V. This voltage range allows the necessary electrical power to be supplied to high-power consumers in a simplified manner, but without raising the voltage to such an extent that, in the event of repair, servicing personnel or, in the event of an accident, rescue personnel or vehicle occupants are put at risk due to high voltages. The second voltage being approximately between two times and three times the magnitude of the first voltage additionally means that the on-board electrical system with an increased voltage can be coupled to the low-voltage on-board electrical system in a simple manner and the second voltage can be converted into the first voltage with a high degree of efficiency.

A second aspect of the disclosure relates to a motor vehicle comprising an internal combustion engine and a battery system according to the first aspect of the disclosure. The motor vehicle is preferably designed as a micro-hybrid motor vehicle.

BRIEF DESCRIPTION OF THE DRAWINGS

The disclosure will be explained in greater detail below with reference to figures of exemplary embodiments. In the figures, identical or similar reference symbols identify identical or similar elements, and in said figures:

FIG. 2 shows an exemplary embodiment of the battery system according to the disclosure.

DETAILED DESCRIPTION

Figure 1:
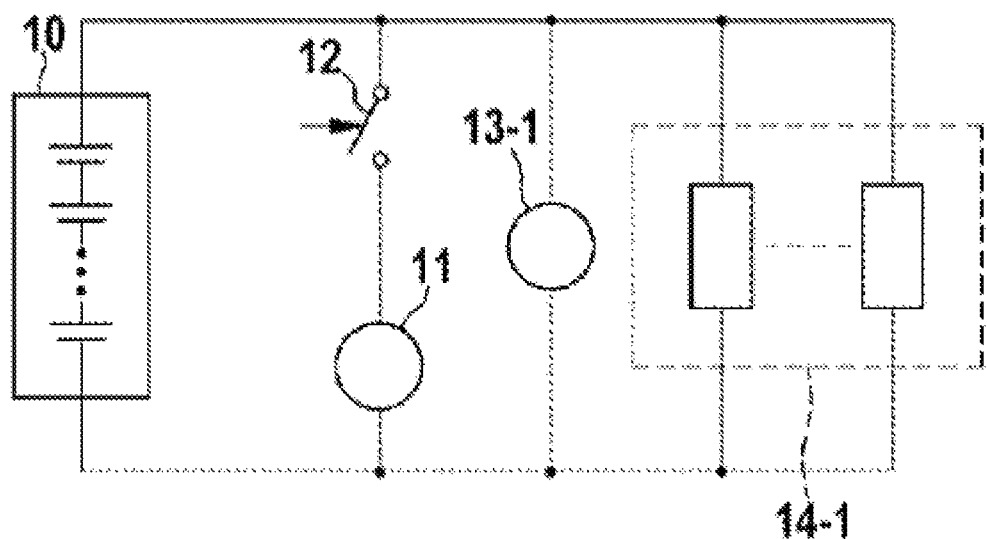
FIG. 1 shows a battery system according to the prior art.

FIG. 2 shows an exemplary embodiment of the battery system according to the disclosure. A first battery 10, which is preferably designed as a lithium-ion battery, supplies a voltage of preferably 10 V to 15 V to a starter circuit, wherein the exact voltage is dependent on the state of charge of the first battery 10. A starter 11 is connected to the first battery 10, said starter being designed to start an internal combustion engine (not illustrated). A switch 12, which is controlled by a starter signal, is connected in series with the starter 11. If the switch 12 is closed, the starter 11 is activated and a current flows from the first battery 10 through the starter 11. With preference, no further electrical consumers are provided parallel to the starter 11, in order to not additionally load the first battery 10. The starter circuit is connected to a low-voltage on-board electrical system by means of a coupling unit 17 which is designed as a DC/DC converter in the example. The coupling unit 17 is designed to draw electrical energy from the low-voltage on-board electrical system and to make electrical energy available to the starter circuit, as a result of which the first battery 10 is recharged. A diode 18 can optionally be provided, said diode connecting the low-voltage on-board electrical system to the starter circuit if the voltage in the starter circuit falls below the voltage of the low-voltage on-board electrical system.

The low-voltage on-board electrical system has its own battery, the second battery 15 which is preferably designed as a lithium-ion battery and is designed to generate a voltage of preferably 10 V to 15 V. At least one electrical consumer 14-2 is also provided in the low-voltage on-board electrical system, said electrical consumer being designed for operation at the voltage of 10 V to 15 V. An example of electrical consumers of this kind may be a navigation device and the like.

The low-voltage on-board electrical system is connected to an on-board electrical system with an increased voltage by means of a further coupling unit 16 which is likewise designed as a DC/DC converter in the example. The on-board electrical system with an increased voltage contains a third battery 20 which generates a voltage of preferably 24 V to 45 V. The on-board electrical system with an increased voltage comprises an electrical generator 13-2 as an additional voltage source, said electrical generator being operated by the (started) internal combustion engine and being designed to generate a voltage of preferably 30 V to 45 V, but preferably a voltage higher than the voltage of the third battery. The further coupling unit 16 is designed to draw electrical energy from the on-board electrical system with an increased voltage and to supply electrical energy to the low-voltage on-board electrical system, as a result of which the second battery 15 is charged and the power required for the operation of the at least one electrical consumer 14-2 is made available. In contrast, the on-board electrical system with an increased voltage contains electrical consumers of the kind which consume a relatively high electrical power and therefore are operated in a relatively simple manner by a relatively high voltage which is generated, according to the disclosure, by the third battery or the electrical generator 13-2, in order to reduce the currents required. High-power consumers 19 of this kind are illustrated by way of example in FIG. 2. Said high-power consumers can be, for example, electrical air-conditioning compressors or heating systems.

It goes without saying that, in particular, the first coupling unit 16 and, under certain circumstances, the second coupling unit 17 as well can also be designed for the bidirectional transportation of charge. Designing the disclosure in this way allows charge to be transferred between the individual batteries or on-board electrical systems as required.

The disclosure therefore provides an on-board electrical system or battery system for a motor vehicle comprising an internal combustion engine, preferably a micro-hybrid motor vehicle, which on-board electrical system or battery system is better suited to feeding high-power consumers and has a higher degree of reliability than solutions according to the prior art.

The invention claimed is:

1. A battery system for a motor vehicle having an internal combustion engine, comprising:
    a starter circuit comprising:
        a first battery, and
        a starter which is configured to be connected to the first battery and is configured to start the internal combustion engine in response to a starter signal;
    a low-voltage on-board electrical system comprising:
        a second battery which is configured to generate a first voltage and to output the first voltage to the low-voltage on-board electrical system, and
        at least one electrical consumer; and
    an on-board electrical system with an increased voltage comprising:
        a third battery which is configured to generate a second voltage, which is higher than the first voltage, and to output the second voltage to the on-board electrical system with an increased voltage, and
        an electrical generator which is configured to be operated by the internal combustion engine and to generate a third voltage, which is higher than the second voltage, and to output the third voltage to the on-board electrical system with an increased voltage;
    wherein the on-board electrical system with an increased voltage is connected to the low-voltage on-board electrical system by a first coupling unit which is configured to draw electrical energy from the on-board electrical system with an increased voltage and to supply electrical energy to the low-voltage on-board electrical system; and
    wherein the low-voltage on-board electrical system is connected to the starter circuit by a second coupling unit which is configured to draw electrical energy from the low-voltage on-board electrical system and to supply electrical energy to the starter circuit.

2. The battery system as claimed in claim 1, wherein at least one of the first battery, the second battery, and the third battery is configured as a lithium-ion battery.

3. The battery system as claimed in claim 1, wherein the on-board electrical system with an increased voltage has at least one high-power consumer.

4. The battery system as claimed in claim 1, wherein the at least one electrical consumer of the low-voltage on-board electrical system is a music system, a navigation device, or an electric window winder.

5. The battery system as claimed in claim 1, further comprising a diode, an anode of said diode being connected to the low-voltage on-board electrical system and a cathode of said diode being connected to the starter circuit.

6. The battery system as claimed in claim 1, wherein the first battery is configured to generate the first voltage and to output the first voltage to the starter circuit.

7. The battery system as claimed in claim 1, wherein one or more of the first coupling unit and the second coupling unit are DC/DC converters.

8. The battery system as claimed in claim 1, wherein the first voltage is between 10 V and 15 V.

9. The battery system as claimed in claim 1, wherein the second voltage is between 24 V and 45 V.

10. A motor vehicle, comprising:
    an internal combustion engine; and
    a battery system including:
        a starter circuit comprising:
            a first battery, and
            a starter which is configured to be connected to the first battery and is configured to start the internal combustion engine in response to a starter signal;
        a low-voltage on-board electrical system comprising:
            a second battery which is configured to generate a first voltage and to output the first voltage to the low-voltage on-board electrical system, and
            at least one electrical consumer; and
        an on-board electrical system with an increased voltage comprising:
            a third battery which is configured to generate a second voltage, which is higher than the first voltage, and to output the second voltage to the on-board electrical system with an increased voltage, and an electrical generator which is configured to be operated by the internal combustion engine and to generate a third voltage, which is higher than the second voltage, and to output the third voltage to the on-board electrical system with an increased voltage;

wherein the on-board electrical system with an increased voltage is connected to the low-voltage on-board electrical system by a first coupling unit which is configured to draw electrical energy from the on-board electrical system with an increased voltage and to supply electrical energy to the low-voltage on-board electrical system; and wherein the low-voltage on-board electrical system is connected to the starter circuit by a second coupling unit which is configured to draw electrical energy from the low-voltage on-board electrical system and to supply electrical energy to the starter circuit.

11. The battery system as claimed in claim 3, wherein the at least one high-power consumer is an electrical air conditioning compressor, an electrical heating system, or an electric motor.

12. The motor vehicle as claimed in claim 10, wherein the motor vehicle is a micro-hybrid motor vehicle.

* * * * *